April 23, 1929.  A. O. AUSTIN  1,709,826
MEANS FOR DIVERTING ENERGY FROM HIGH POTENTIAL CONDUCTORS
Filed Jan. 21, 1928  2 Sheets-Sheet 1
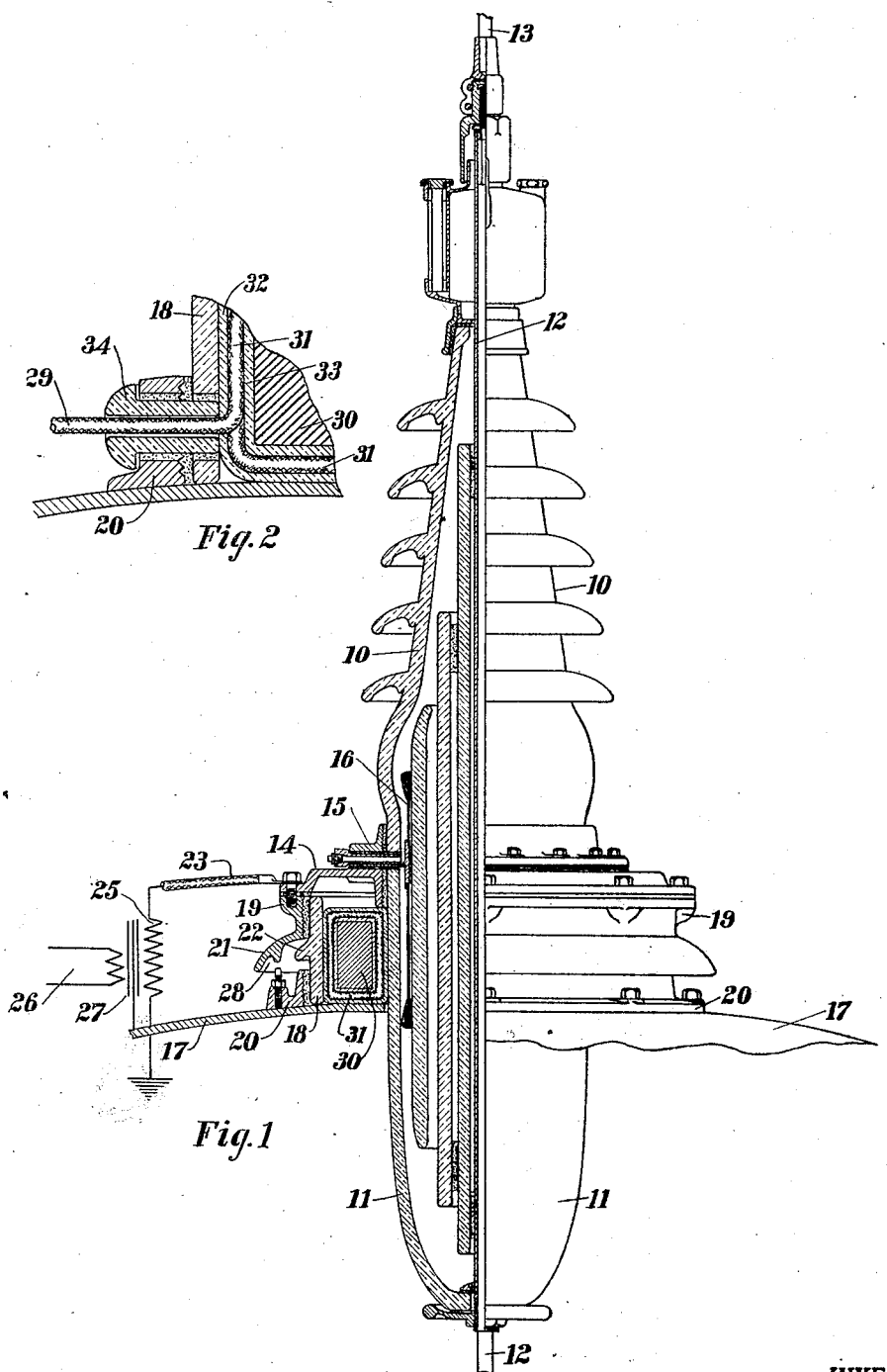

April 23, 1929.   A. O. AUSTIN   1,709,826
MEANS FOR DIVERTING ENERGY FROM HIGH POTENTIAL CONDUCTORS
Filed Jan. 21, 1928   2 Sheets-Sheet 2

Patented Apr. 23, 1929.

1,709,826

UNITED STATES PATENT OFFICE.

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

MEANS FOR DIVERTING ENERGY FROM HIGH-POTENTIAL CONDUCTORS.

Application filed January 21, 1928. Serial No. 248,472.

This invention relates to means for diverting relatively small amounts of energy from high potential transmission lines for synchronizing, relay operation, voltage indication, and other purposes, and has for one of its objects the provision of means of the class names which shall be convenient and economical to install and operate and which will not require the use of expensive transformers.

Other objects and advantages will appear from the following description.

The invention is exemplified in the combination and arrangement of parts shown in the accompanying drawing and described in the following specification, and it is more particularly pointed out in the appended claims.

In the drawing—

Fig. 1 is a part elevation and part section of a high potential bushing insulator having one embodiment of the present invention applied thereto; and Fig. 2 is a fragmentary sectional view showing the bushing for the conductor lead connected with the current transformer.

Figure 3:
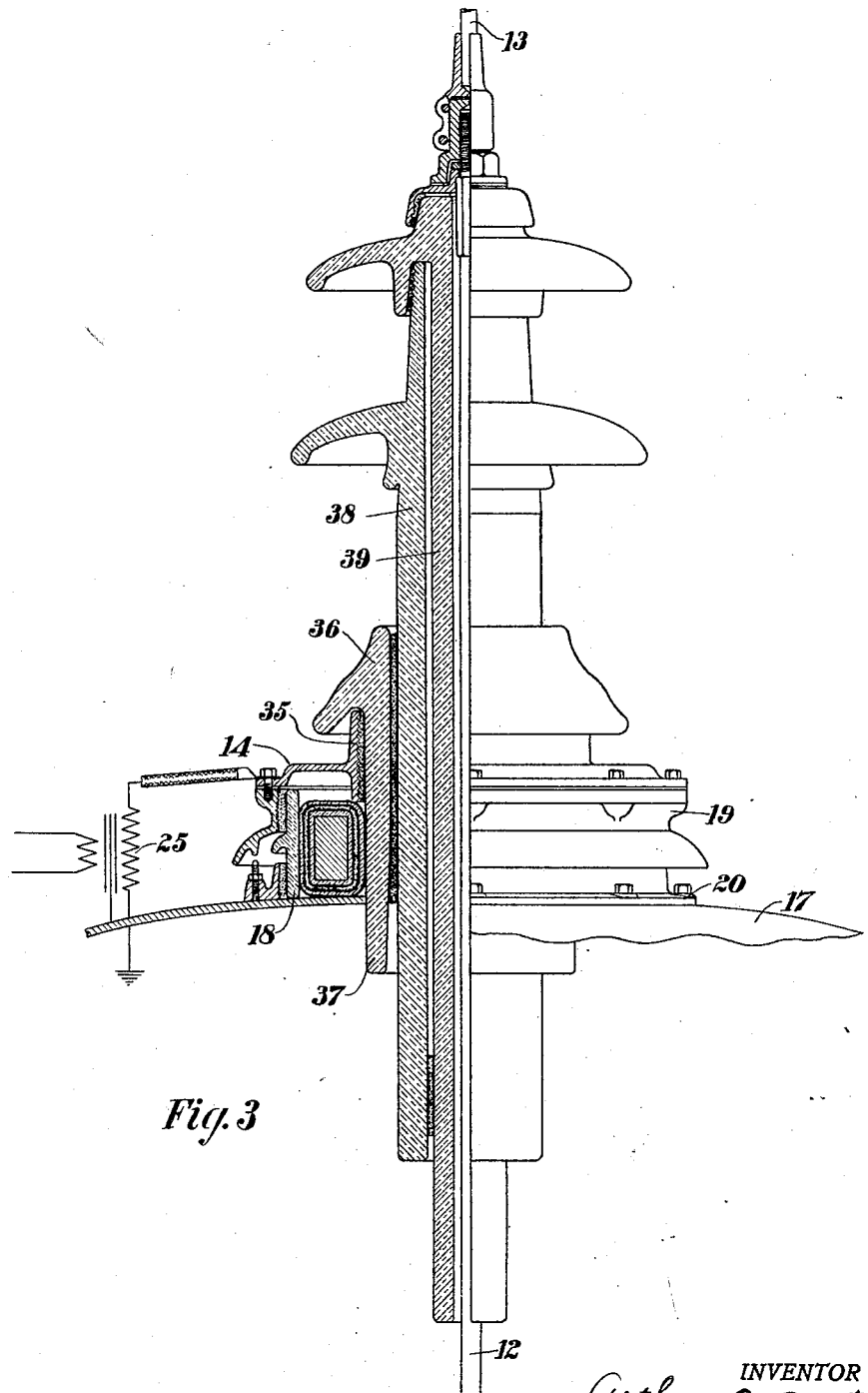
Fig. 3 is a view similar to Fig. 1 showing somewhat different form of the invention.

In high voltage circuits of transmission lines it is frequently necessary or advisable to have an indication of the current flowing in the line and also some indication of the voltage on the line or conductors. This can be obtained by the use of current transformers and potential transformers. Where the voltage is high, however, the insulation requirements of this class of apparatus make it necessary to build apparatus having considerable cost and size. Apparatus of this kind frequently causes an increased hazard owing to the fact that its is made as small as possible. Where bushings may be used for the installation of current transformers and the electrostatic capacity of the bushing used for potential or polarity determinations, the electrical hazard is not materially increased and the bushing may be utilized for supplying the necessary insulation with but slight additonal cost. One method which has been used in the past is to use a plate or conducting layer in the bushing to form a condenser with the high voltage lead. Where the electrostatic capacity between this conductor is large, this means can be readily used for the operation of electrostatic relays, for synchronizing, or voltage determination. In general, however, the electrostatic capacity is smaller than desired and at very high voltages is likely to be too small for efficient operation of synchronizing apparatus or relays under most conditions. In the ordinary bushing it is not possible or feasible to use the capacity plate forming the condenser with the lead at any very considerable voltage above the flange of the bushing as otherwise breakdown will take place or a very special bushng will be required.

In the improved method a comparatively small electrostatic capacity in the bushing may be used to advantage to supply the necessary energy for voltage indication, for synchronizing, or the operation of electrostatic relays. The construction also lends itself to the installation of current transformers.

In Fig. 1 is shown a high voltage bushing such as is used in the higher voltage transmission lines. While the electrostatic capacity of these bushings is too small for successful operation of synchronizing apparatus, relays, and similar use, where the leads are run any distance from the bushing, the present invention makes it possible to obtain the necessary energy very readily. The bushing has insulated housings 10 to 11 and a conductor 12 connected through a lead 13 to the transmission line. The flange portions 14 and 15 together with the electrostatic screens 16 form an electrostatic condenser with the conductor 12. Where the flange 14 is fastened directly to the cover 17 of the circuit breaker or transformer, the charging current flows to ground. Where the electrostatic screen 16 is insulated from the flanges 14 and 15, an insulated lead may be brought out and used for supplyng energy or potential as desired. In general, however, this arrangement will not furnish sufficient insulation unless the sleeve 16 is insulated for considerable voltage between the electrostatc screen and flange 14.

Since the power or energy in a circuit is a product of the voltage and current, it is necessary that each of these factors be recognized in obtaining the necessary energy. In the case of the bushing, the current is limited almost entirely by the electrostatic capacity between the metal parts 14, 15 and 16 and the conductor 12 through the center of the bushing. The amount of current flowing in the condenser will increase directly as the voltage and also as the frequency. The voltage and frequency are usually fixed on any particular system.

The useful energy for synchronizing apparatus, voltage indication or the operation of relays must be taken from the low voltage side of this condenser and in order to obtain power from this source it is necessary that the voltage be high enough so that the product of the voltage times current will be sufficient for the purpose required.

If the mounting flange 14 is insulated from the cover or case 17, the voltage between 14 and 17 may be increased to a very appreciable value. It is comparatively easy with the arrangement shown to increase this to 10 k. v. or 20 k. v. if desired. Since the increase in potential at this point is relatively small compared to the potential or voltage between the lead and conducting members of the bushing, raising the voltage between the mounting flange 14 and the cover 17 or ground will lower the charging current flowing through the bushing but little compared to the increase in voltage between the flange and ground. The energy available will be approximately proportional to the square of the voltage between the flange 14 and grounded case 17. The flange 14 is insulated from ground by an insulating member 18 mounted in suitable flanges 19 and 20. The surface of the insulating flange 18 is protected by a rain shed 21 and the insulating surface of the member 18 may be further increased by suitable petticoats, one of which is shown at 22. In the arrangement shown, a regular type of bushing may be installed in the insulating flange combination made up of the flange 19, insulating member 18 and base flange 20. In Fig. 1, space is provided between the insulating member 18 and the lower insulating cone of the bushing 11 for the installation of a current transformer. This arrangement keeps the current transformer above the case where it is readily accessible. Since this current transformer is above the case, it may be usually made of sufficient size to give the desired properties without seriously affecting the clearance. In general, the increase in height due to the insertion of the insulating flange forming the current transformer pocket can be utilized to advantage as this gives a greater clearance between the live parts of the bushing and ground. This is particularly true in the case of circuit breakers where the operating mechanism usually cuts down the clearance or the distance between terminals of the bushing is limited owing to the size of the circuit breaker tank. In the case of transformers having conservator tanks, the increase in height is an advantage in that it tends to provide additional clearance or removes the live parts further away from the surfaces of ground potential. Where the electro-static capacity of the bushing is amply large, a lead 23 may be run a considerable distance from the bushing for voltage determination, for synchronizing, or the operation of relays, as desired. Even though it is possible to obtain considerable energy by the insulated flange, this energy is made up with a decidedly limited current and a high voltage so that it is not suitable for the operation of most apparatus. The fact that the voltage is high makes it difficult to obtain the necessary insulation in the lead 23 and the relatively large electrostatic capacity of the lead 23 to ground if run for any distance tends to absorb energy so that the utilization of the energy directly usually limits operations to the immediate vicinity of the bushing. This is particularly true where the voltage over the insulating section is high and the electrostatic capacity of the bushing small. This difficulty, however, is easily overcome in the present arrangement by the use of a transformer having a primary winding 25 and a low voltage winding 26 with core 27. One end of the high voltage winding is attached to the bushing flange or lead 23 and the other end to the case or ground 17. It is evident that the impedance in the transformer would permit it being subjected to very high potentials where the bushing is subjected to surges or transients from the line. These would readily break down the transformer winding unless a very expensive transformer were used. To obviate this difficulty a limiting gap may be placed at the transformer or between the two sides of the insulating flanges as at 28. This gap may be made small enough so as to protect the transformer, by-passing or limiting the abnormal or high voltage disturbances thrown upon the winding 25, thereby permitting the use of a small inexpensive transformer. The use of a transformer such as one designed for 10,000 volts on one side and 110 volts on the low side will usually provide ample energy so that apparatus may be operated from the low voltage winding 26 of the transformer. Since this voltage is comparatively low and the current increased, the leads may be run to a considerable distance from the bushing or transformer without materially affecting the results. It will be seen that with this arrangement it is possible to use ordinary bushings and to obtain sufficient energy so that auxiliary apparatus other than the transformer and limiting gap is not necessary for the operation of relays, synchronizing apparatus, or voltage determination. By properly designing the transformer, its characteristics may be varied considerably.

The method of obtaining insulation between flange and case may be varied considerably to suit different conditions. In Fig. 2 is shown an enlarged view of the outlet from one of the leads 29 from the current transformer having a magnetic core 30 and winding 31. This winding 31 is insulated from the bushing flange and other parts by a layer of insulation 32 and from the core by a layer of insulation 33 as well as insulation on the conductors. The leads from the current transformer may come out through a conduit or through a bushing 34 which passes through the lower mounting flange 20 and insulating member 18.

Fig. 3 shows an application of the present invention to a bushing insulator of a different form from that shown in Fig. 1. In Fig. 3 the insulator is not provided with an internal flux screen like that shown at 16 in Fig. 1, but instead, the supporting flange 14 is provided with a plate or ring 35, the upper edge of which is covered by the flange 36 on one of the tubular members 37 of the insulator. Although the insulator shown in the drawing is illustrated as composed of three concentric tubular members 37, 38 and 39, it will be apparent that the same form of supporting flange 14 and ring 35 can be applied to an insulator of one or more tubular parts. The plate or ring 35 forms a condenser with the conductor 12 which operates in a manner similar to the condenser formed by metal parts 14, 15 and 16 and the conductor 12 is the form of the invention shown in Fig. 1. The flange 14 is supported by an insulator ring 18 and the transformer 25 is connected up with the flange 14 in the manner previously described. It will be apparent to those skilled in the art that the invention may be applied to other insulators besides the ones illustrated in the drawings.

I claim:—

1. In combination, an insulator, a grounded support for said insulator, a conductor insulated from said support by said insulator, a member of conducting material insulated from said support and also from said conductor and forming a condenser with said conductor, and a transformer having its primary winding connected between said member of conducting material and said grounded support so that said transformer is energized through the condenser formed by said member of conducting material and said conductor.

2. In combination, a bushing insulator, a grounded support on which said insulator is mounted, a conductor extending through said insulator, a member of conducting material insulated from said conductor and from said grounded support and forming a condenser with said conductor, and a transformer having its primary winding connected between said member of conducting material and said grounded support.

3. In combination, a bushing insulator, a grounded support for said insulator, a metallic flux screen member connected with said insulator and insulated from said conductor and from said grounded support, and a transformer having its primary winding connected between said screen member and ground for diverting energy from said conductor.

4. In combination, a bushing insulator, a conductor extending through said insulator, a grounded support for said insulator, a metallic supporting member for said insulator mounted on said grounded support and insulated therefrom, and a transformer having its primary winding connected between said metallic supporting member and said grounded support.

5. In combination, a bushing insulator, a conductor extending through said insulator, a metallic supporting member for said insulator, said member being insulated from said conductor and also from ground, and a transformer having its primary winding electrically connected between said supporting member and ground.

6. In combination, a bushing insulator, a conductor extending through said insulator, a screening member of conducting material surrounding said conductor and insulated both from said conductor and ground and forming a condenser with said conductor, and a transformer electrically connected between said screening member and ground.

7. In combination, a bushing insulator, a conductor extending through said insulator, a screening member of conducting material surrounding said conductor and insulated therefrom, a metal supporting member for said insulator electrically connected with said screening member and insulated from ground, and a transformer having its primary winding electrically connected between said supporting member and ground.

8. In combination, an insulator, a conductor carried by said insulator, a metallic support for said insulator, means for insulating said metallic support from ground, and a transformer having its primary winding electrically connected between said metallic support and ground.

9. In combination, a bushing insulator, a metal flange for supporting said insulator, a conductor extending through said insulator, a dielectric member for supporting said flange, and a transformer having its primary winding interposed between said flange and ground.

10. In combination, a bushing insulator, a conductor extending through said insulator, a metallic flange for supporting said insulator projecting radially therefrom, a dielectric supporting member for said flange, and a transformer having its primary winding electrically connected between said supporting member and ground.

11. In combination, a bushing insulator, a conductor extending through said insulator, a radially extending flange for supporting said insulator, a dielectric member for supporting said flange, and a current transformer element disposed beneath said flange and between said insulator and dielectric supporting member.

12. In combination, a bushing insulator, a conductor extending through said insulator, a radially extending flange for supporting said insulator, a dielectric ring spaced outwardly from said insulator for supporting said flange, a transformer having its primary winding electrically connected between said flange and ground, and a current transformer element disposed beneath said flange and between said bushing insulator and said dielectric ring.

13. In combination, a bushing insulator, a conductor extending through said insulator, a supporting flange extending radially from said insulator, a dielectric support for said flange forming a casing beneath said flange, and a current transformer element disposed in said casing.

14. In combination, a bushing insulator, a conductor extending through said insulator, a metal flange for supporting said insulator extending radially therefrom, said flange having a downwardly and outwardly extending petticoat thereon forming a casing space beneath said flange, a dielectric ring for supporting said flange and cooperating with said flange to complete the casing formed thereby, said ring having a petticoat thereon, a current transformer element surrounding said insulator and disposed in said casing, and a supporting member for said dielectric ring forming a lower wall for said casing.

15. In combination, a housing for electrical apparatus, a conductor extending into said housing, a bushing insulator surrounding said conductor where it passes into said housing, a metallic flange secured to said insulator, a dielectric member resting on said housing and supporting said flange and insulating said flange from said housing, and a transformer having its primary winding connected between said flange and said housing.

16. In combination, a housing for electrical apparatus, a conductor extending into said housing, a bushing insulator surrounding said conductor where it passes into said housing, a metallic flange secured to said insulator, a dielectric support for said flange resting on said housing and insulating said flange from said housing, a transformer having its primary winding electrically connected between said flange and said housing, and a discharge gap between said flange and housing for limiting the voltage on said primary winding.

17. In combination, an insulator, a conductor carried by said insulator, a member of conducting material insulated from said conductor and ground and forming a condenser with said conductor, a transformer having its primary winding electrically connected between said member of conducting material and ground, and an arcing gap between said member of conducting material and ground for limiting the voltage on said primary winding.

18. In combination, a housing for electrical apparatus, a conductor extending into said housing, a bushing insulator surrounding said conductor, a flange secured to said insulator, a screening member connected with said flange and insulated from said conductor, a dielectric ring resting on said housing and supporting said flange and forming an enclosed casing beneath said flange and between said ring and bushing insulator, a current transformer element disposed in said casing, a transformer having its primary winding electrically connected between said flange and housing, and an adjustable arcing gap between said flange and housing.

19. In combination, a bushing insulator, a conductor extending through said insulator, a grounded support for said insulator, a metallic supporting member for said insulator mounted on said grounded support and insulated therefrom, and an electrical translating device electrically connected between said metallic supporting member and said grounded support.

20. In combination, a bushing insulator, a conductor extending through said insulator, a metallic supporting member for said insulator, said member being insulated from said conductor and also from ground, and an electrical translating device electrically connected between said supporting member and ground.

21. In combination, a bushing insulator, a conductor extending through said insulator, a screening member of conducting material surrounding said conductor and insulated therefrom, a metallic supporting member for said insulator electrically connected with said screening member and insulated from ground, and an electrical translating device electrically connected between said supporting member and ground.

22. In combination, a bushing insulator, a metallic flange for supporting said insulator, a conductor extending through said insulator, a dielectric member for supporting said flange, and an electrical translating device electrically connected between said flange and ground.

23. In combination, a housing for electrical apparatus, a conductor extending into said housing, a bushing insulator surrounding said conductor where it passes into said housing, a metallic flange secured to said insulator, a dielectric member resting on said housing and supporting said flange and insulating said flange from said housing, and an electrical translating device electrically connected between said flange and said housing.

In testimony whereof I have signed my name to this specification this 20th day of January, A. D. 1928.

ARTHUR O. AUSTIN.